United States Patent [19]

Rebeschi et al.

[11] 4,392,084

[45] Jul. 5, 1983

[54] SUSTAINER CIRCUIT FOR PLASMA DISPLAY PANELS

[75] Inventors: Thomas J. Rebeschi, North Haven; Mohan L. Kapoor, Orange, both of Conn.

[73] Assignee: The United States of America as represented by the Secretary of the Army, Washington, D.C.

[21] Appl. No.: 243,292

[22] Filed: Mar. 13, 1981

[51] Int. Cl.[3] .................... H05B 37/00; H05B 41/14; H02J 1/00

[52] U.S. Cl. .................... 315/169.4; 315/231; 315/232; 307/15; 307/38

[58] Field of Search .................... 315/169.4, 173, 231, 315/232, 240; 307/15, 38; 340/286, 713, 752, 803; 323/209

[56] References Cited

U.S. PATENT DOCUMENTS

| | | | |
|---|---|---|---|
| 3,458,711 | 7/1969 | Calkin et al. | 307/15 X |
| 3,626,244 | 12/1971 | Holz | 315/169.4 |
| 3,681,655 | 8/1972 | Toombs | 315/169.4 |
| 3,821,596 | 6/1974 | Leuck | 315/169.4 |
| 3,993,990 | 11/1976 | Miller et al. | 340/324 M |
| 4,001,636 | 1/1977 | Tottori | 315/169.4 |

*Primary Examiner*—Eugene La Roche
*Assistant Examiner*—Vincent De Luca
*Attorney, Agent, or Firm*—Robert P. Gibson; Jeremiah G. Murray; Edward Goldberg

[57] ABSTRACT

Circuitry for selectively sustaining a gaseous discharge display panel to display selected information which circuitry permits the use of a single power supply.

4 Claims, 4 Drawing Figures

FIG. 1
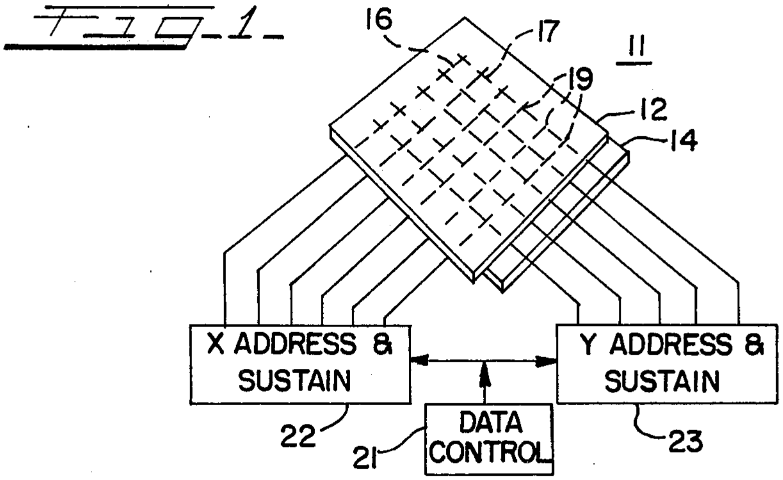
FIG. 2
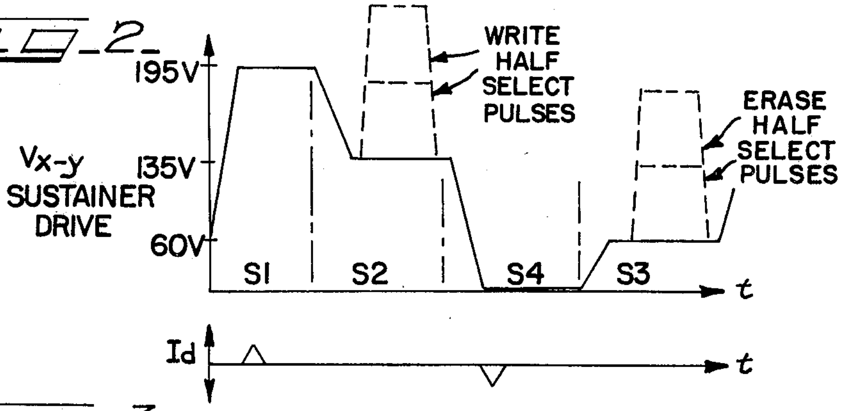
FIG. 3
PRIOR ART
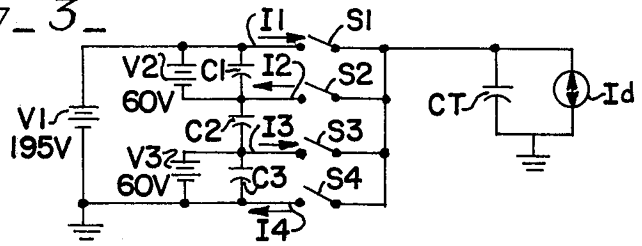
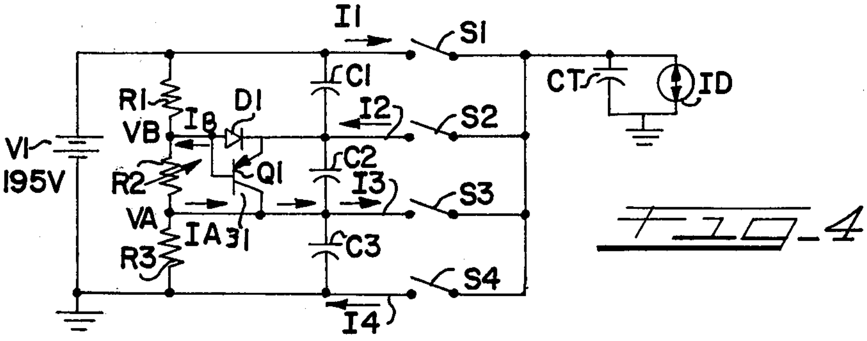
FIG. 4

SUSTAINER CIRCUIT FOR PLASMA DISPLAY PANELS

U.S. GOVERNMENT RIGHTS

The Government has rights in this invention pursuant to Contract No. DAAB07-76-C-1762 awarded by the Department of the Army.

BACKGROUND OF THE INVENTION

Plasma display panels of the matrix type are well known in the art. Such panels are described in, for example, U.S. Pat. Nos. 3,681,655; 3,626,244; 3,821,596; 3,993,990 and 4,001,636. Plasma display panels commonly incorporate enclosed panels, gaseous medium, and first and second sets of electrodes. As is known, the gaseous medium can be ionized (charged) or discharged by coupling suitable amplitude signals to corresponding electrodes. The state of the selected cells can be maintained by providing suitable sustaining signals to the associated electrodes. The selection and sustaining operations are explained in the above-mentioned patents.

As sketched in FIG. 1, plasma display panels 11 of the type above, commonly comprise two parallel glass plates 12 and 14 with a plurality of parallel positioned electrode lines 16 and 17 deposited on each inner glass surface with a dielectric material coating on the electrodes. The lines 16 and 17 on each of the panel 12 and 14 are positioned orthogonally in rows "X", and columns "Y" to form a matrix of intersections. The plates 12 and 14 are separated and bonded around the edge to form a cavity which is filled with a neon gas mixture.

Each intersecting point or cell of the matrix, generally labeled 19, is selected to provide a display point by addressing the respective row and column electrodes. The particular cell will then be discharged and the desired data entered therein in response to the input data received from the associated control system 21, as is well known in the art. The cells 19 are addressed or selected, and their selected condition sustained by the "X" sustaining and addressing system 22, and the "Y" sustaining and addressing 23, as is known.

As depicted in FIG. 2, the sustaining or sustainer drive is a differential voltage developed across the X and Y electrode lines. In normal operation, the sustainer drive voltage indicated on the axis of ordinates of FIG. 2 is below the neon gas discharge level required to ignite the panel. The writing operation; that is, data entry into a cell requires two half-select pulses, one on each, of the X and Y matrix electrodes. The two-half select pulses add at the cell or matrix intersection to increase the normal sustainer voltage above the gas discharge level and fire the cell. When the cell ignites, free electrons on the dielectric surface and in the neon gas tend to migrate towards the positive electrode and build a "wall" charge. When a sufficient charge has accumulated, it will neutralize the externally applied voltage and the discharge stops. As shown in FIG. 2, the write pulses are normally added on a base voltage level which minimizes the possibility of other cells firing.

In the normal sequence of operation, the cell fires after the sustain level is reached, the wall charge is built up, and then the cell extinguishes the discharge. On the following negative excursion of the sustainer voltage the wall charge will add to the sustainer voltage and again cause a discharge to occur. Thus, the cell will continue to discharge after the initial write pulse, and will be sustained.

The erase operation requires the wall charge to be removed and the cell returned to its off state. The wall charge can be removed by generating two half-select pulses on each X and Y matrix electrode with a pulse of insufficient pulse width and amplitude to rebuild the wall charge for the next cycle. As mentioned, the half-select pulses are required on the X and Y matrix electrodes to minimize the possibility of other cross-over cells on either line from also writing or erasing.

A plasma panel, as briefly described above can, for certain electrical considerations, be represented as a capacitor with a parallel current generator, representing the neon gas plasma discharge.

Referring to the representative prior art circuit of FIG. 3, a voltage supply V1 providing 195 volts is connected through switch S1 to provide power to a first terminal or plate of capacitor CT (depicting the plasma display panel) and a parallel current generator Id. The other plate of capacitor CT is connected to ground reference. A second power supply V2, providing 60 volts, is connected across a capacitor C1. One terminal of supply V2 and one terminal or plate of capacitor C1 is connected to one side of switch S1, and the other side of switch S1 is connected to capacitor CT. The opposite terminals of power supply V2 and capacitor C1 are connected to one side of a switch S2 and thence to capacitor CT. A third power supply V3 also providing 60 volts, is connected across a capacitor C3. Capacitor C3 is connected in a series circuit with capacitors C1 and C2. One terminal of each of power supply V3, and of capacitor C3 is connected to one side of a switch S3. The other side of switch S3 is connected to the first plate of capacitor CT. As noted, the other plate of capacitor CT connects to ground. A fourth switch S4 connects the ground reference of power supply V1 to the first terminal or plate of capacitor CT; that is, switch S4 shorts capacitor CT to ground.

Note that the switches S1, S2, S3 and S4 indicated in FIGS. 3 and 4 as mechanical switches, represent transistor or IC (integrated chip) switches selectively operated to provide the various operating steps or voltage levels of FIG. 2.

The prior art circuit of FIG. 3 represent a typical method of generating the sustainer drive with a saturated switch at each voltage level. As indicated, this requires three power supplies.

DESCRIPTION OF THE DRAWINGS

This invention and its relation to the prior art is being explained in conjunction with the accompanying drawings in which:

FIG. 1 is a block diagram illustrating a plasma display panel having a plurality of "X" electrodes and "Y" electrodes, and the sustaining system in accordance with the principles of the present invention;

FIG. 2 shows waveforms useful in explaining the operation of the system of the invention.

FIG. 3 is a circuit diagram of a typical prior art circuit; and,

FIG. 4 is a circuit diagram of the inventive circuit.

SUMMARY OF THE INVENTION

This invention relates to plasma display panels and more particularly to an improved circuitry for providing a sustaining voltage for A.C. plasma display panels from a single power supply.

DESCRIPTION OF INVENTION

Refer now to FIG. 4 which shows the inventive circuit provided to minimize power supply circuit complexity. In FIG. 4, the circuit components that represent like components as those in FIG. 3 are numbered similarly.

The power supply V1 provides +195 volts to capacitor CT (representing the plasma display panels) through switch S1, similarly as in FIG. 3. Series connected resistor R1, R2 and R3 are connected across supply V1 to function as a voltage divider. The voltage appearing at the junction of resistors R1 and R2 is labeled as VB and the voltage appearing at the junction of resistors R2 and R3 is labeled as VA. Series connected capacitor network C1, C2 and C3 is connected across the resistor network. One terminal or plate of capacitor C1 connects to one terminal of switch S1, the other plate of capacitor C1, and hence the junction of capacitors C1 and C2, connects to one terminal of switch S2. The other plate of capacitor C2, and hence the junction of capacitors C2 and C3, connects to one terminal of switch S3; and, the opposite plate of capacitor C3, connects to one terminal of switch S4 and ground reference. The other terminal of each of switches S1, S2, S3 and S4 connect to one terminal or plate of capacitor CT; and, the opposite plate of capacitor CT connects to ground reference.

An active shunt circuit labeled as 31 includes a transistor Q1 having its base connected to terminal point VB, its emitter connected to the junction of capacitors C1 and C2, and its collector connected to the junction of capacitors C2 and C3. A diode D1 is connected across the base to emitter of transistor Q1, with its anode connected to terminal point VB and its cathode connected to the junction of capacitors C1 and C2.

The voltage V1 represents the supply voltage. The voltage VB represents an intermediate high voltage, and the voltage VA represents an intermediate lower voltage. In the embodiment disclosed V1=+195 volts, VB=+135 volts and VA=+60 volts.

The currents I1, I2, I3 and I4 represent the currents flowing through the electrical switches S1, S2, S3 and S4 respectively, when those switches are closed. As mentioned, the electrical switches S1, S2, S3 and S4 depict the voltage switching which occurs during the operations indicated in FIG. 2. Currents IA and IB are the net currents at junction points VA and VB, respectively.

Note from FIG. 3, that switches S2 and S3 generate equal and opposite voltage levels. Therefore, currents I2 and I3 are equal in magnitude, except for slight differences in individual transistor or IC switch characteristics. Note also from FIG. 2 that the current Id occurs only during the closure of switches S1 and S4. The similar operation occurs in FIG. 4. As above, the capacitor CT and current generator Id represent the plasma display panel.

A basic feature of the circuit of FIG. 4 as contrasted with the circuit of FIG. 3, is that only a single +195 volt power supply V1 is required, in contrast to the three supplies commonly utilized. In FIG. 4, the power supply is connected across the resistor divider network R1, R2 and R3 to assure that the voltage VA=195−VB. Since the operating range must allow for panel to panel operating voltage variations, the variable resistor R2 effectively provides a means of varying the output power.

The active shunt circuit 31, comprising a PNP transistor Q1 and diode D1, is used to direct the current I2 into the junction point VA. The magnitude of current I2 is equal to current I3, therefore, the net current through the voltage divider comprising resistors R1, R2 and R3 is approximately zero, due to these currents.

The active shunt circuit 31 requires a transistor Q1 with a high Beta characteristic of approximately 100. Transistor Q1 receives current I2 into the emitter. The collector current will be 0.99×I2 current and is connected to terminal point VA.

The net current at terminal point VB will be $$IB=(0.01)(I2)$$

The net current at VA will be $$IA=I3-(0.99)(I2)=(0.01)(I3)$$

The sequence of operation of the circuit of FIG. 4 is as follows:

On initial application of V1 power, resistor divider R1, R2, and R3 will set the voltages VA and VB. Diode D1 will be forward biased charging C2 to VB–VD1 (≈0.7 V). Upon closing the switch S1, the current flows from the power supply V1 into CT and charges CT to the voltage V1. Then switch S1 is opened and S2 is closed and the current I2 flows from CT into the junction of C1–C2. The current is in a direction to reverse bias D1 and turn-on Q1. The voltage at the junction of C1–C2 will rise until the emitter of Q1 is +0.7 volts above VB and the transistor Q1 will turn On. The transistor Q1 shunts the current I2 into C3. Then switch S2 is opened and S4 is closed discharging CT to 0 volts. Switch S4 is then opened and S3 is closed and CT is charged by I3 to the VA level. The currents I3 and I2 are equal in magnitude but opposite in direction and, therefore, the currents cancel in C3. The cycle is then started from the beginning with S3 opening and S1 closing to generate the waveform of FIG. 2. Without Q1 the currents I2 and I3 would discharge C1 and C3 respectively and the voltages VB and VA would not be maintained by the resistor divider network R1, R2, and R3.

A further reduction in loading on the resistor network R1, R2 and R3 may be obtained by utilizing a Darlington transistor device with a high Beta of approximately 1000, in lieu of transistor Q1.

An advantage of the inventive circuitry is that by providing an active shunt the power requirements for the 60 volt and 135 volt power supplies are reduced to almost zero; this enables a single voltage divider comprising resistors to supply the 135 V and 60 V levels.

The circuit of FIG. 4, is applicable to AC plasma panel displays generally, and may also be used in any system where capacitive devices are driven symmetrically.

While the invention has been particularly shown and described with reference to a preferred embodiment thereof, it will be understood by those skilled in the art, that various changes in form and details may be made therein without departing from the spirit and scope of the invention.

We claim:

1. A voltage supply circuit for a gaseous discharge display panel comprising two closely spaced parallel transparent dielectric plates having respective sets of interior parallel electrodes, one set being orthognal to the other to form a matrix of closely spaced intersections, a gaseous medium enclosed between said plates and filling the spaces between said intersections, a power supply having positive and reference terminals, a voltage divider network including first, second and third resistors connected in series between said power supply terminals to provide three predetermined voltage levels for operating said panel, first, second, and third capacitors connected in series across said voltage divider, each capacitor being in parallel with a respective said resistor, a selectively active shunt circuit switching means connected to said second resistor and capacitor, and means for selectively connecting said voltage divider network to said panel to provide writing, erasing and sustaining voltages at selected discrete levels to selected intersections of said panel.

2. The circuit of claim 1 wherein said active shunt circuit comprises transistor means having base, emitter and collector electrodes, said base being connected to one side of said second resistor, said collector being connected to the other side of said second resistor and second capacitor, and a diode connected in a reverse polarity between the emitter and base of said transistor, said emitter being connected to one side of said second capacitor.

3. The circuit of claim 2 wherein said means for selectively connecting said voltage divider network provides four different voltage levels to said panel, and includes a first switch means connecting the power supply voltage across said voltage divider network to said panel, a second switch means connected to one side of said shunt circuit at an intermediate terminal of said voltage divider to provide an intermediate voltage to sustain said panel, a third switch means connected to the other side of said shunt circuit at a lower intermediate terminal to provide a lower intermediate voltage, and a fourth switch means connecting said panel to a ground reference.

4. The circuit of claim 3 wherein said second resistor is variable.

* * * * *